Figure 3:
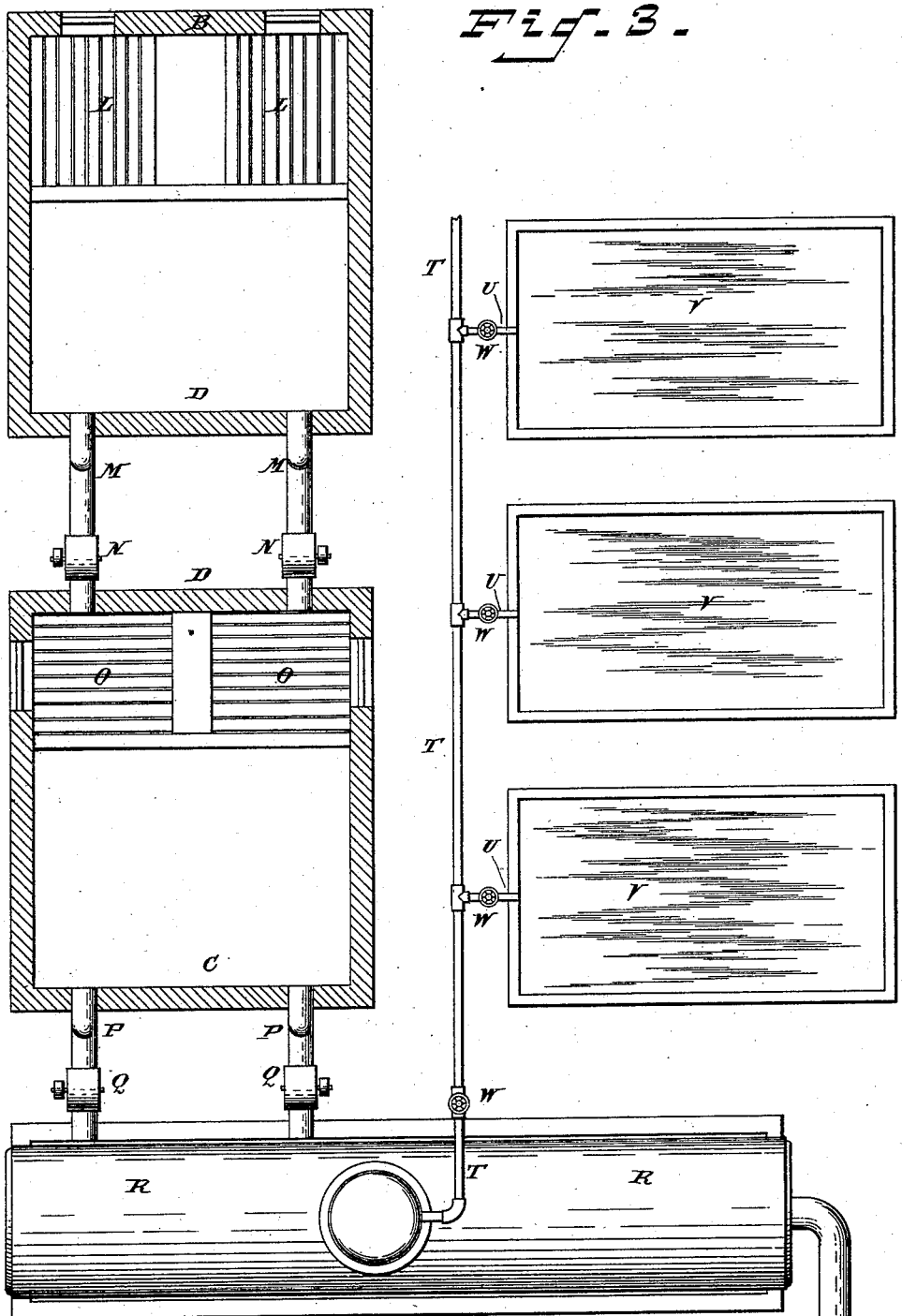

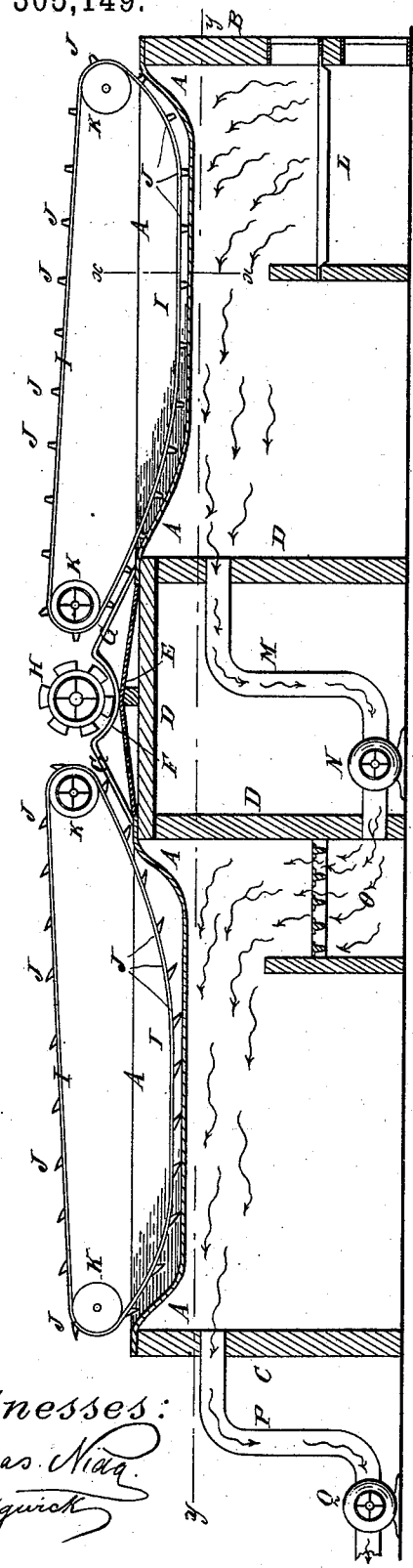

(No Model.) 3 Sheets—Sheet 2.

J. A. COOK.
CORRUGATED PAN FOR SALT MAKING.

No. 305,149. Patented Sept. 16, 1884.

Witnesses:
Inventor:
J. A. Cook
by Munn & Co
Attorneys.

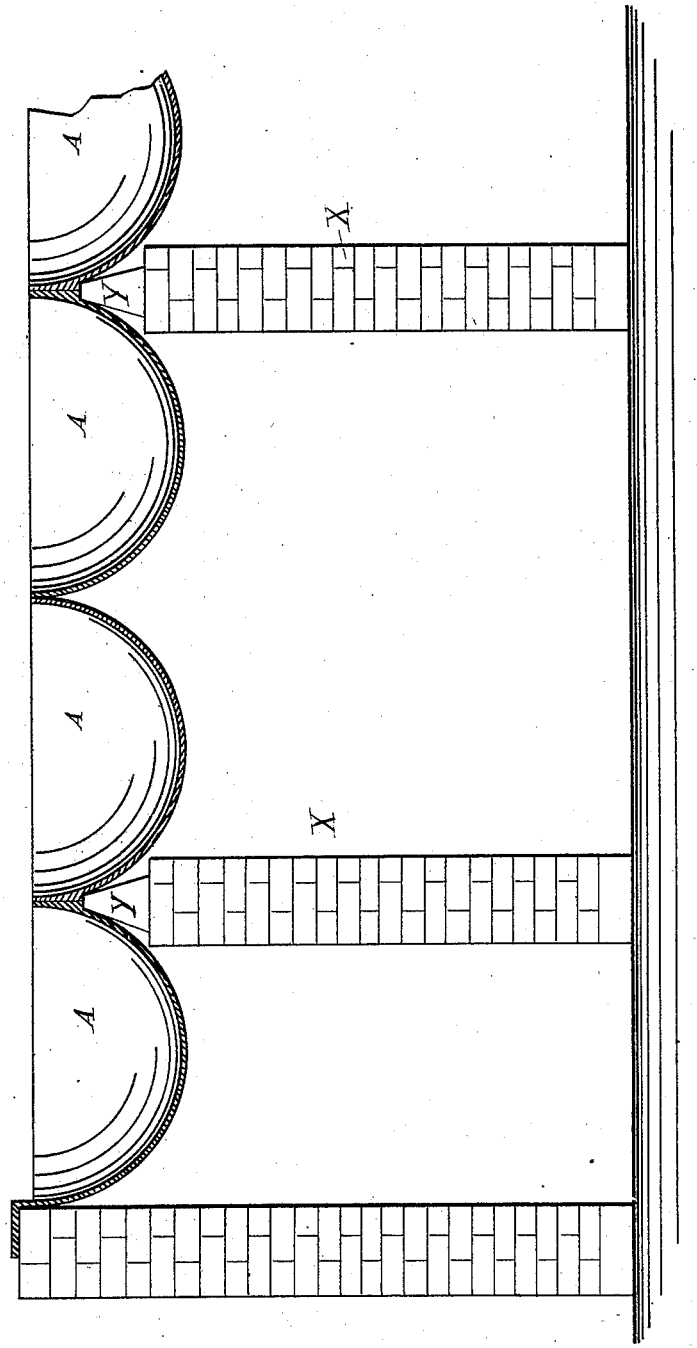

UNITED STATES PATENT OFFICE.

JOSEPH A. COOK, OF AUBURN, NEW YORK.

CORRUGATED PAN FOR SALT-MAKING.

SPECIFICATION forming part of Letters Patent No. 305,149, dated September 16, 1884.

Application filed March 24, 1884. (No model.)

*To all whom it may concern:*

Be it known that I, JOSEPH A. COOK, of Auburn, in the county of Cayuga and State of New York, have invented a new and useful Improvement in Corrugated Pans for Salt-Making, of which the following is a full, clear, and exact description.

Reference is to be had to the accompanying drawings, forming a part of this specification, in which similar letters of reference indicate corresponding parts in all the figures.

Figure 1, Sheet 1, is a sectional side elevation of my improvement. Fig. 2, Sheet 1, is a sectional end elevation of one of the pans, taken through the line $x\ x$, Fig. 1. Fig. 3, Sheet 2, is a sectional plan view of the furnace, and showing in plan view the apparatus for warming the brine. Fig. 4, Sheet 3, is a sectional end elevation of a part of a pan, showing a side wall and supporting-piers.

My invention relates to improvements in evaporating-pans; and it consists in the peculiar construction and arrangement of parts, all as hereinafter fully described, and pointed out in the claims.

The pan A is made of boiler-plates or cast sections to be bolted together, and with longitudinal corrugations. The corrugations can be made separately, and the troughs thus formed riveted to each other at their adjacent edges, as shown in Fig. 2. The ends of the pan may rest upon the front and rear walls, B C, of the furnace, as shown, or upon the side walls of the furnace, to expose the side of the pan to the heat. The middle part of the pan A rests upon the cross-wall D, which is made with a wide space between its parts, as shown in Figs. 1 and 3. The pans A are further supported by piers X, built beneath them, and provided with iron caps Y, so formed as to fit into the angular spaces between the corrugations of the said pans, as shown in Fig. 4. Across the middle part of the pan A is formed a raised ridge, E, the sides of which incline downward toward the bottom of the corrugations of the said pan. Above the ridge E is placed a semi-tubular spout, F, the sides of which have wide downwardly-inclined flanges G formed upon them, to rest upon the lower parts of the inclined sides of the ridge E, to form inclined planes, up which the salt-crystals are drawn to the said spout F. The spout F and its flanges G have numerous cross-slots formed in them, to allow the brine to leach back into the pan A. In the spout F is placed a feed-screw, H, to feed the salt-crystals to some suitable receiver, and which is driven from a steam-engine or other suitable power.

The salt-crystals are drawn from the bottoms of the corrugations of the pan A by endless belts I, of cloth or other suitable material, and to which are attached cross-cleats J, of wood or other suitable material. The endless belts I pass around rollers K, pivoted to some suitable support, and to which motion is given from a steam-engine or other suitable power.

Beneath the forward end of the pan A is formed the main fire-box L, from which the products of combustion pass along the bottom of the said pan A, and are drawn through pipes M, passing through the double cross-walls D, by suction-fans N, placed in the said pipes, and are discharged into the second fire-box, O, below the fire-grates, so that the smoke and the combustible gases will be consumed while passing through the fire upon the said grates. From the second fire-box the products of combustion pass along the bottom of the rear part of the pan A, and are drawn out through pipes P, set in the rear wall, C, of the furnace, by suction-fans Q, placed in the said pipes P, and driven from a steam-engine or other suitable power. The products of combustion from the pipes P are discharged into the flues of the steam-boiler R, or into the furnace of the said boiler, and pass thence to the stack S. The boiler R is designed to generate steam, which is conducted through pipes T U to the tanks V, to warm the brine in the said tanks before it is introduced into the pan A, and thus separate impurities from the brine which could not be otherwise removed. The pipes T U are provided with stop-cocks W, to allow the steam to be readily controlled.

Having thus described my invention, I claim as new and desire to secure by Letters Patent—

1. The combination, with the corrugated pan A, of the raised ridge E, extending across the middle part of said pan, the tubular slotted spout F, having inclined slotted flanges G, and the feed-screw H, arranged in the tubular spout, substantially as shown and described.

2. The combination, with the corrugated pan A and the central ridge, E, of the slotted spout, the inclined slotted flanges, the feed-screw H, and the endless belts I, having cross-cleats J, substantially as herein shown and described.

3. The combination, with the main fire-boxes L O, of the pipe M, extending to the fire-box L and entering the same below its grate, and the suction-fan N, arranged in said pipe, substantially as herein shown and described.

4. The combination, with the fire-boxes L O and the steam-boiler R, of the pipes M P and the suction-fans N O, substantially as herein shown and described.

5. The combination, with a corrugated salt-making pan, of supporting-piers X, having caps Y, adapted to fit into the angular spaces between the corrugations of the said pan, substantially as herein shown and described, whereby the said pan will be firmly supported, as set forth.

JOSEPH A. COOK.

Witnesses:
E. H. AVERY,
DONALD JUDSON.